(12) United States Patent
Chen et al.

(10) Patent No.: US 10,883,183 B2
(45) Date of Patent: Jan. 5, 2021

(54) METHOD OF PREPARING COPPER-COPPER NITRIDE NANOCATALYSTS FOR CARBON DIOXIDES REDUCTION REACTION

(71) Applicant: HONDA MOTOR CO., LTD, Tokyo (JP)

(72) Inventors: Shutang Chen, Raymond, OH (US); Gugang Chen, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 15/953,079

(22) Filed: Apr. 13, 2018

(65) Prior Publication Data

US 2019/0316264 A1    Oct. 17, 2019

(51) Int. Cl.

| | | |
|---|---|---|
| C25B 11/04 | (2006.01) | |
| B01J 19/08 | (2006.01) | |
| C25B 9/10 | (2006.01) | |
| B01J 27/24 | (2006.01) | |
| B01J 23/72 | (2006.01) | |
| B01J 6/00 | (2006.01) | |
| C01B 32/50 | (2017.01) | |
| C01B 21/06 | (2006.01) | |

(52) U.S. Cl.
CPC ............ *C25B 11/0478* (2013.01); *B01J 6/00* (2013.01); *B01J 19/087* (2013.01); *B01J 23/72* (2013.01); *B01J 27/24* (2013.01); *C01B 21/0625* (2013.01); *C01B 32/50* (2017.08); *C25B 9/10* (2013.01); *C25B 11/0405* (2013.01); *C25B 11/0415* (2013.01); *B01J 2219/0803* (2013.01); *B01J 2219/0875* (2013.01); *B01J 2219/0892* (2013.01)

(58) Field of Classification Search
CPC ........ B01J 23/24; B01J 27/24; B01J 31/0237; B01J 23/72; C01B 32/50; C01B 21/0625
See application file for complete search history.

(56) References Cited

U.S. PATENT DOCUMENTS

| | | |
|---|---|---|
| 7,208,133 B2 | 4/2007 | Cho et al. |
| 7,850,933 B2 | 12/2010 | Yang et al. |

(Continued)

FOREIGN PATENT DOCUMENTS

| | | | | |
|---|---|---|---|---|
| CN | 101805011 B | 11/2011 | | |
| JP | 2014119748 A | * 8/2014 | ......... | C01B 21/0625 |

(Continued)

OTHER PUBLICATIONS

Thanh (Mechanisms of Nucleation and Growth Nanoparticles in Solution, Chemical Reviews (2014), 114 p. 7610-7630).*

(Continued)

*Primary Examiner* — Jun Li
(74) *Attorney, Agent, or Firm* — Arent Fox LLP

(57) ABSTRACT

Catalysts, particularly nanocatalysts, useful for converting carbon dioxide into desired conversion products, such as sustainable chemicals and fuels. The nanocatalysts may comprise at least one nanoparticle having a main component and a secondary component, wherein at least one of the main component and the secondary component facilitates the conversion of carbon dioxide. The present disclosure also relates to methods for preparing the nanocatalysts described herein and methods of using the same.

8 Claims, 17 Drawing Sheets

(56) References Cited

U.S. PATENT DOCUMENTS

| | | | |
|---|---|---|---|
| 7,931,730 B2 | 4/2011 | Lee et al. | |
| 7,935,170 B2 | 5/2011 | Jun et al. | |
| 8,486,305 B2 | 7/2013 | Zinn et al. | |
| 8,845,878 B2* | 9/2014 | Cole | C25B 3/04 205/555 |
| 2008/0138643 A1 | 6/2008 | Lee et al. | |
| 2009/0283743 A1* | 11/2009 | Coe-Sullivan | B82Y 20/00 257/9 |
| 2010/0275729 A1* | 11/2010 | Jun | B22F 1/0025 75/364 |
| 2016/0152892 A1 | 6/2016 | O'Brien et al. | |
| 2017/0173573 A1* | 6/2017 | Berkowitz | B01J 31/062 |

FOREIGN PATENT DOCUMENTS

| | | |
|---|---|---|
| KR | 101725315 B1 | 4/2017 |
| WO | WO 2005/060610 A2 | 7/2005 |
| WO | WO 2015/195650 A1 | 12/2015 |
| WO | WO 2017/192515 A1 | 11/2017 |

OTHER PUBLICATIONS

Wu et al., Simple One-Step Synthesis of Uniform Disperse Copper Nanoparticles, Mater. Res. Soc. Symp. Proc., 879E:2005, pp. Z6.3.1-Z6.3.6).*

Wang (Controllable Synthesis of Cu-based Nanocrystals in ODA Solvent, Chem. Commun. 2011, vol. 47, p. 3604-3606).*

Clement Barriere et al., "Ligand effects on the air stability of copper nanoparticles obtained from organometallic synthesis" Journal of Materials Chemistry, 22, pp. 2279-2285, 2012.

Manoj B. Gawamde et al., "Cu and Cu-Based Nanoparticles: Synthesis and Applications in Catalysis" Chemical Reviews, 116, pp. 3722-3811, 2016.

S. Chen et al., "Electrochemical Reduction of Carbon Dioxide with Nitrogen-Doped Copper Nanoparticles" 233rd ECS Meeting, Abstract.

* cited by examiner

METHOD OF PREPARING COPPER-COPPER NITRIDE NANOCATALYSTS FOR CARBON DIOXIDES REDUCTION REACTION

TECHNICAL FIELD

The present disclosure is directed to nanocatalysts, specifically those for use in carbon dioxide reduction reactions.

BACKGROUND OF THE DISCLOSURE

Converting carbon dioxide into sustainable chemicals and fuels is a promising solution for reducing dependence on fossil fuel sources. However, a major challenge for effective conversion (e.g., the chemical reduction of carbon dioxide) lies in the catalysts used for these reactions. Current carbon dioxide conversion catalysts include noble metals, bimetals, inter-metals, metal oxides, metal sulfides, and metalloporphyrins. However, while many of these catalysts have been screened for carbon dioxide conversion reactions, very few are recyclable, stable with time, and selective for the desired products.

BRIEF DESCRIPTION OF THE DISCLOSURE

The present disclosure relates to catalysts, particularly nanocatalysts, useful for converting carbon dioxide into desired conversion products, such as sustainable chemicals and fuels. According to some aspects, the nanocatalysts may comprise at least one nanoparticle having a main component and a secondary component, wherein at least one of the main component and the secondary component facilitates the conversion of carbon dioxide. The present disclosure also relates to methods for preparing the nanocatalysts described herein and methods of using the same.

DETAILED DESCRIPTION OF THE DISCLOSURE

Figure 1:
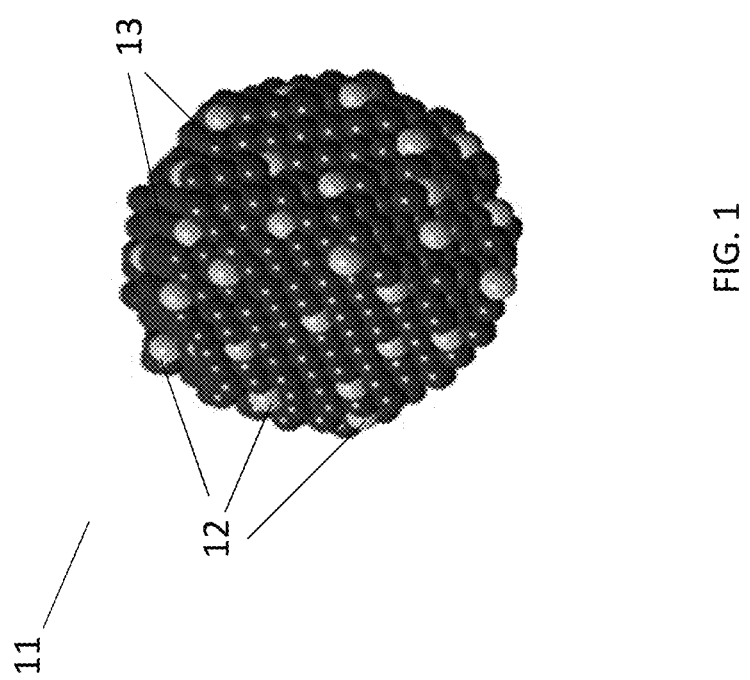
FIG. 1 shows an example nanocatalyst nanoparticle according to aspects of the present disclosure.

The present disclosure relates to catalysts, particularly nanocatalysts, useful for converting carbon dioxide into sustainable chemicals and fuels. According to some aspects, the nanocatalysts may comprise at least one nanoparticle having a main component and a secondary component, wherein at least one of the main component and the secondary component facilitates the conversion of carbon dioxide. The present disclosure also relates to methods for preparing the nanocatalysts described herein and methods of using the same.

According to aspects of the disclosure, the nanocatalysts may comprise at least one nanoparticle. As used herein, the term nanoparticle refers to a discrete particle having a diameter of between 1 and 100 nm.

According to some aspects, the nanocatalysts may comprise a main component and a secondary component, wherein at least one of the main component and the secondary component facilitates the conversion of carbon dioxide into one or more products.

The main component may comprise a carbon dioxide conversion catalyst. As used herein, the term "carbon dioxide conversion catalyst" refers to a substance wherein at least a portion thereof catalyzes the chemical conversion of carbon dioxide to a desired product. Examples of carbon dioxide conversion catalysts include, but are not limited to, noble metals, transition metals, bimetals, inter-metals, metal oxides, metal sulfides, metalloporphyrins, and combinations thereof. In some examples, the main component may comprise copper, carbon nitride, metal disulfide, metal carbide, metal nitride, and/or salts thereof.

The nanocatalyst may further comprise a secondary component. As used herein, the term "secondary component" refers to a component present in the nanocatalyst at a concentration lower than 5% of the concentration of the main component, optionally lower than 4%, optionally lower than 3%, optionally lower than 2%, and optionally lower than 1%.

According to some aspects, the nanocatalyst may comprise a main component nanoparticle doped with the secondary component. As used herein, the term "dope" refers to the intentional introduction of impurities into a nanoparticle for modulating its catalytic properties. It should be understood that the secondary component may additionally act as a carbon dioxide conversion catalyst and/or may aid (directly and/or indirectly) the main component in facilitating the conversion of carbon dioxide. For example, the secondary component may provide oxidation resistance to the nanocatalyst and/or may facilitate multiple proton and electron transfers to synthesize multicarbon products during carbon dioxide conversion reactions. It should be understood that the effect(s) provided by the secondary component may depend on the identity of the secondary component, the concentration of the secondary component in the nanocatalyst, and combinations thereof, among other properties.

According to some aspects, the secondary component may comprise a non-metal. In some examples, the secondary component may comprise nitrogen, sulfur, selenium, oxygen, phosphorus, and combinations thereof.

According to some aspects, the secondary component may be provided with the main component in order to provide optimal conversion of carbon dioxide. For example, as shown in FIG. 1, secondary component particles 12 may be provided at or near the surface of a nanocatalyst nanoparticle 11, wherein the nanocatalyst nanoparticle also comprises main component particles 13 throughout.

According to some aspects, the secondary component may be coupled with portions of the main component, for example, via one or more bonds selected from the group consisting of ionic bonds, covalent bonds, polar bonds, hydrogen bonds, and combinations thereof. For example, in the case where the main component comprises copper and the secondary component comprises nitrogen, the secondary component may be coupled to the main component via at least a covalent bond such that the nitrogen is provided as part of a copper(I) nitride ($Cu_3N$) compound.

The present disclosure also relates to methods for preparing the nanocatalyst nanoparticles described herein. According to some aspects, the method may comprise converting a precursor nanoparticle into a nanocatalyst nanoparticle. According to some aspects, the precursor nanoparticle may comprise one or more components of the nanocatalyst as described herein. Additionally or alternatively, the precursor nanoparticle may comprise one or more precursor components, wherein the precursor component(s) are converted into one or more components of the nanocatalyst.

According to some aspects, the precursor nanoparticle may comprise a precursor component that is converted into the secondary component of the nanocatalyst. It should be understood that the precursor component may comprise the secondary component as a portion thereof such that conversion of the precursor nanoparticle into the nanocatalyst nanoparticle includes removing all portions of the precursor component other than the secondary component from the nanoparticle. For example, if the secondary component comprises nitrogen, the precursor component may comprise a molecule having one or more nitrogen atoms. In this example aspect, conversion of the precursor nanoparticle into the nanocatalyst nanoparticle may comprise removing all portions of the precursor component other than one or more of the nitrogen atoms.

It is also within the scope of the present disclosure that all or a portion of the precursor component may be converted into the secondary component via one or more chemical reactions. For example, if the secondary component comprises a chemical compound, one or more portions of the precursor component may be converted into the chemical compound via one or more chemical reactions, even if the chemical compound is not initially present as a portion of the precursor component.

According to some aspects, when the secondary component comprises nitrogen, the precursor component may comprise a molecule having a carbon-nitrogen (C—N) bond. For example, the precursor component may comprise an alkylamine. Examples of alkylamines include, but are not limited to, primary aliphatic amines having carbon numbers of 2 to 20, and combinations thereof, such as, for example, tetradecylamine (TDA), hexadecylamine (HDA), octadecylamine (ODA), and combinations thereof.

Figure 2:
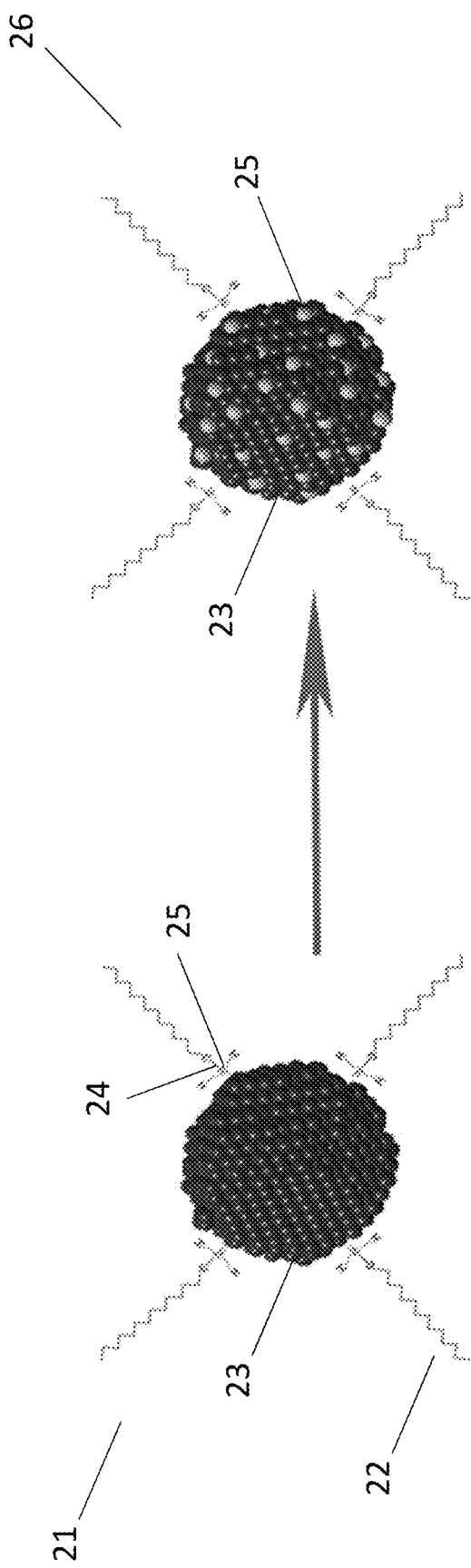
FIG. 2 shows a schematic of an example conversion reaction for preparing a nanocatalyst nanoparticle according to aspects of the present disclosure.

In one example aspect, as shown in FIG. 2, the precursor component molecules 22 may comprise one or more alkylamines which are bound to the surface of the precursor nanoparticle 21. The precursor nanoparticle 21 may further comprise particles of the main component 23 throughout.

Figure 3:
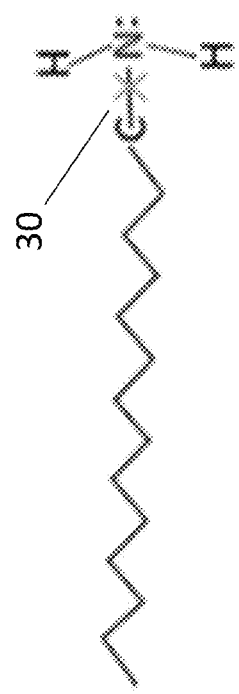
FIG. 3 shows a schematic of an example C—N bond breakage.

As can also be seen in FIG. 2, conversion of a precursor nanoparticle into a nanocatalyst nanoparticle 26 may comprise breaking the C—N bond 24 of one or more precursors component molecules 22. (FIG. 3 shows a schematic of an example C—N bond 30 breakage.) As shown in FIG. 2, by breaking the C—N bond 24, every portion of the corresponding precursor component molecule 22 may be removed from the precursor nanoparticle 21 except the nitrogen atom 25. In this way, a nanocatalyst nanoparticle 26 (e.g., a $Cu_3N$—Cu nanoparticle) may be provided having particles of the main component 23 throughout and having at least one secondary component, i.e., nitrogen atoms 25 from one or more precursors component molecules 22, doped on the surface thereof. It should be understood that all of the precursor component molecules 22 may be converted in this way, or only a portion of the precursor component molecules 22 may be converted such that the resulting nanocatalyst nanoparticle 26 may comprise both nitrogen atoms 25 and precursor component molecules 22 doped on the surface thereof.

According to some aspects, the method for converting a precursor nanoparticle into a nanocatalyst nanoparticle may comprise one or more additional steps. For example, before, during, or after the precursor component is converted into the secondary component, one or more precursor particles and/or one or more nanocatalyst nanoparticles may be subject to Ostwald ripening. Although those skilled in the art will understand the mechanism of Ostwald ripening, it should be understood that generally, this process occurs because molecules on the surface of particles are less energetically stable than inner molecules. For this reason, the unstable surface molecules often go into solution. As these molecules go into solution, the particles as a whole may shrink over time as the number of free molecules in solution increases. The free molecules in solution may then redeposit on other existing particles. In this way, small particles may decrease in size before eventually disappearing, and large particles may enlarge.

According to some aspects, the method for preparing the nanocatalyst nanoparticle(s) as described herein may comprise one, two, or more synthesis steps. As used herein, the term "synthesis step" refers to the execution of one or more reaction(s) to obtain a product.

For example, according to some aspects, the method may comprise a first synthesis step including preparing an ionic solution containing ions of the main component, ions of the precursor component, and/or complexes thereof, and a second step comprising converting the ionic solution into a solution containing the nanocatalyst nanoparticle(s) as described herein. It should be understood that as used herein, the term "ion" refers to a molecule having a net electric charge.

According to some aspects, preparing the ionic solution may comprise combining the main component (and/or complexes and/or salts and/or hydrates thereof) with molecules of the precursor component, optionally together with a solvent, at an elevated temperature. The solvent may be any solvent useful according to the present disclosure, including but not limited to, hydrocarbons such as, for example, 1-octadecene, benzyl ether, diphenyl ether, and combinations thereof. According to some aspects, the amount of the main component (and/or complexes and/or salts and/or hydrates thereof) used in this step may be between about 1 and 200 mg, optionally between about 10 and 150 mg, and optionally between about 15 and 120 mg. According to some aspects, the amount of precursor component used in this step may be between about 100 and 300 mg, optionally between about 150 and 250 mg, and optionally about 200 mg. According to some aspects, the main component (and/or complexes and/or salts and/or hydrates thereof) and the molecules of the precursor component may be combined under an inert gas atmosphere, examples of which include, but are not limited to, atmospheres containing argon, nitrogen, and combinations thereof. According to some aspects, the inert gas atmosphere may be devoid of reactive gases such as, for example, oxygen and carbon dioxide.

Examples of complexes and/or salts and/or hydrates of the main component include, but are not limited to, acetates, acetylacetonates, and/or hydrates of the main component and mixtures thereof. For example, if the main component comprises copper, the ionic solution may be prepared by combining copper acetate hydrate, copper (I) acetate, copper acetylacetonate, or a mixture thereof with molecules of the precursor component, optionally together with the solvent.

According to some aspects, the main component (and/or complexes and/or salts and/or hydrates thereof) and the molecules of the precursor component, optionally together with the solvent, may be combined at an elevated temperature of between about 140 and 220° C., optionally between about 150 and 210° C., optionally between about 150 and 200° C., optionally between about 160 and 190° C., and optionally about 180° C. The main component (and/or complexes and/or salts and/or hydrates thereof) and the molecules of the precursor component, optionally together with the solvent, may be kept at the elevated temperature for between about 15 and 45 minutes, optionally between about 25 and 35 minutes, and optionally about 30 minutes to provide the ionic solution.

According to some aspects, the ionic solution may comprise one or more ionic complexes. For example, the ionic solution may comprise ionic complexes of copper and one or more of tetradecylamine (TDA), hexadecylamine (HDA), and octadecylamine (ODA). According to some aspects, the concentration of copper in the ionic solution (both as a free copper ion and as part of an ionic complex) may be between about 0.01 and 0.25 mol/L, optionally between about 0.02 and 0.20 mol/L, and optionally between about 0.03 and 0.12 mol/L.

According to some aspects, the second synthesis step may comprise combining the ionic solution with additional precursor component molecules to provide a combined ionic solution and subjecting the combined ionic solution to an elevated temperature for a selected amount of time to provide nanocatalyst nanoparticle(s). For example, the ionic solution may be injected into a solution containing the additional precursor component molecules to provide the combined ionic solution. It should be understood that the solution containing the additional precursor component molecules may be at room temperature or it may be heated to an elevated temperature as described herein prior to the injection of the ionic solution.

As used herein, the term "additional precursor component molecule" refers to a precursor component molecule in addition to those used in the first synthesis step. It should be understood that the additional precursor component molecules may comprise any precursor component molecule as described herein, which may be the same type as or a different type from the precursor component molecules used in the first synthesis step. According to some aspects, the amount of additional precursor component used in this step may be between about 1 and 10 g, optionally between about 2 and 8 g, optionally between about 4 and 6 g, and optionally about 5 g.

According to some aspects, the second synthesis step may comprise subjecting the combined ionic solution to an elevated temperature for a selected amount of time to provide a solution containing the nanocatalyst nanoparticle(s). According to some aspects, the elevated temperature may between about 160 and 240° C., optionally between about 180 and 220° C., optionally between about 190 and 210° C., and optionally about 200° C. According to some aspects, the elevated temperature may be no higher than about 240° C., optionally no higher than about 220° C. According to some aspects, the selected amount of time may be between about 20 and 120 minutes, optionally between about 40 and 100 minutes, optionally between about 40 and 80 minutes, and optionally about 60 minutes. According to some aspects, the selected amount of time may be at least 20 minutes.

According to some aspects, the second synthesis step may further comprise cooling the solution to a second temperature after the selected amount of time. For example, the second synthesis step may further comprise cooling the solution to a temperature of between about 70 and 130° C., optionally between about 80 and 120° C., optionally between about 90 and 110° C., and optionally about 100° C. The second synthesis step may then further comprise combining the cooled solution with an acceptable solvent. Acceptable solvents include, but are not limited to, hydrophobic solvents such as, for example, ethanol, methanol, acetone, and mixtures thereof.

According to some aspects, the method may comprise a single synthesis step. For example, according to some aspects, the single synthesis step may comprise combining the main component (and/or complexes and/or salts and/or hydrates thereof) with molecules of the precursor component, optionally together with a solvent, at an elevated temperature for a selected period of time. The component (and/or complexes and/or salts and/or hydrates thereof), molecules of the precursor component, and solvent may be any of those as described herein.

According to some aspects, the amount of the main component (and/or complexes and/or salts and/or hydrates thereof) used in the single synthesis step may be between about 1 and 100 mg, optionally between about 40 and 80 mg, and optionally about 60 mg. According to some aspects, the amount of precursor component used in the single synthesis step may be between about 1 and 10 g, optionally between about 2 and 8 g, optionally between about 4 and 6 g, and optionally about 5 g. According to some aspects, the main component (and/or complexes and/or salts and/or hydrates thereof) and the molecules of the precursor component may be combined under an inert gas atmosphere as described herein.

According to some aspects, in the single synthesis step, the main component (and/or complexes and/or salts and/or hydrates thereof) and the molecules of the precursor component, optionally together with the solvent, may be combined at an elevated temperature of between about 140 and 280° C., optionally between about 160 and 260° C., optionally between about 180 and 240° C., and optionally between about 200 and 220° C. The main component (and/or complexes and/or salts and/or hydrates thereof) and the molecules of the precursor component, optionally together with the solvent, may be kept at the elevated temperature for between about 30 and 90 minutes, optionally between about 45 and 75 minutes, and optionally about 60 minutes to provide a solution containing the nanocatalyst nanoparticle(s).

According to some aspects, the method may further comprise one or more washing and/or purification steps. For example, after the nanocatalyst nanoparticle(s) (or a solution containing the same) has been obtained by the one or more synthesis steps as described herein, the nanocatalyst nanoparticle(s) (or a solution thereof) may be purified by dispersing in an acceptable solvent. Acceptable solvents include, but are not limited to, hydrophilic solvents such as, for example, hexane, toluene, chloroform, and combinations thereof. The one or more washing and/or purification steps may comprise centrifuging and/or discarding the supernatant.

The present disclosure also relates to method of using the nanocatalyst nanoparticles as described herein. For example, the method may comprise providing one or more nanocatalyst nanoparticles and contacting carbon dioxide with the one or more nanocatalyst nanoparticles to catalyze the conversion of the carbon dioxide into desired conversion product(s), for example, carbon monoxide, methane, ethane, propanol, formic acid, ethanol, allyl alcohol, ethylene, and combinations thereof.

The present disclosure also related to products comprising the nanocatalyst nanoparticles as described herein. For example, the product may comprise an electrochemical cell used to convert $CO_2$ into desired conversion products as described herein.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, where reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The word "about" is used herein to mean within ±5% of the stated value, optionally within ±4%, optionally within ±3%, optionally within ±2%, optionally within ±1%, optionally within ±0.5%, optionally within ±0.1%, and optionally within ±0.01%.

The following examples are put forth so as to provide those of ordinary skill in the art with a complete disclosure and description of how to make and use the present invention, and are not intended to limit the scope of what the inventors regard as their invention nor are they intended to represent that the experiments described below are all or the only experiments performed. Efforts have been made to ensure accuracy with respect to numbers used (e.g. amounts, dimensions, etc.) but some experimental errors and deviations should be accounted for.

EXAMPLES

Example I: Two-Step Preparation of $Cu_3N$—Cu Nanoparticles

An ionic solution was prepared by dissolving 60 mg of copper acetate hydrate (99.99%) and 200 mg of tetradecylamine (TDA, >96%) in 2 mL of 1-octadecene (98%) on a hot plate at 180° C. for 30 min. During the heating process, TDA was melted (at about 38-40° C.) and coordinated with copper atoms. The resulting product was a stock solution containing Cu-TDA complexes, said complexes having a blue color. The ionic solution had a copper concentration of about 0.03 mol/L.

5.0 g of TDA was loaded into a 25 mL three-neck flask under argon flow, degassed for 20 minutes, and the loaded flask was rapidly heated to 200° C. 2.0 mL of the stock solution was quickly injected into the heated flask. The reaction was held at 200° C. for 60 minutes and then naturally cooled to 100° C. 5 mL of ethanol was injected into the flask. The resulting nanoparticles were then purified by dispersing the reaction mixture in 5 mL of hexane and then centrifuging at 2000 rpm for 2 min. The supernatant was discarded. A total of 5 mL of hexane was then added to the sediment, and the mixture was centrifuged at 3000 rpm for 5 min. The washing procedure was repeated twice to remove unreacted precursors and surfactant. The resulting $Cu_3N$—Cu nanoparticles were then stored in hexane until characterization.

Example II: Two-Step Preparation of $Cu_3N$—Cu Nanoparticles

The procedure was performed according to Example I, except that the TDA was replaced with hexadecylamine (HDA, 98%).

Example III: Two-Step Preparation of $Cu_3N$—Cu Nanoparticles

The procedure was performed according to Example I, except that the TDA was replaced with octadecylamine (ODA, 98%).

Example IV: Two-Step Preparation of $Cu_3N$—Cu Nanoparticles

The procedure was performed according to Example I, except that the flask was heated to 220° C. (rather than to 200° C.).

Example V: Two-Step Preparation of $Cu_3N$—Cu Nanoparticles

The procedure was performed according to Example I, except that the flask was heated to 200° C. and held at this temperature for 40 minutes (rather than 60 minutes).

Example VI: Two-Step Preparation of $Cu_3N$—Cu Nanoparticles

The procedure was performed according to Example I, except that the flask was heated to 200° C. and held at this temperature for 120 minutes (rather than 60 minutes).

Example VII: Two-Step Preparation of $Cu_3N$—Cu Nanoparticles

The procedure was performed according to Example I, except that the amount of copper acetate hydrate used was such that the stock solution contained 0.06 mol/L of copper.

Example VIII: Two-Step Preparation of $Cu_3N$—Cu Nanoparticles

The procedure was performed according to Example I, except that the amount of copper acetate hydrate used was such that the stock solution contained 0.12 mol/L of copper.

Example IX: Single Step Preparation of $Cu_3N$—Cu Nanoparticles 5.0 g of TDA (TDA, >96%), 60 mg of copper acetate hydrate (99.99%), and 2 mL of ODE (98%) was loaded into a 25 mL three-neck flask and degassed under argon flow. After degassing for 20 minutes, the flask was heated to about 200° C. and held at this temperature for 60 minutes and then naturally cooled to 100° C. 5 mL of ethanol was injected into the flask. The resulting nanoparticles were then purified by dispersing the reaction mixture in 5 mL of hexane and then centrifuging at 2000 rpm for 2 min. The supernatant was discarded. A total of 5 mL of hexane was added to the sediment, and the mixture was centrifuged at 3000 rpm for 5 min. The washing procedure was repeated twice to remove unreacted precursors and surfactant. The resulting $Cu_3N$—Cu nanoparticles were then stored in hexane until characterization.

Example X: Single Step Preparation of $Cu_3N$—Cu Nanoparticles

The procedure was performed according to Example IX, except that the flask was heated to about 220° C. (rather than 200° C.).

Example XI: Single Step Preparation of $Cu_3N$—Cu Nanoparticles

The procedure was performed according to Example IX, except that the amount of copper acetate hydrate was replaced with copper (I) acetate (97%).

EXAMPLE XII: Single Step Preparation of $Cu_3N$—Cu Nanoparticles

The procedure was performed according to Example IX, except that the amount of copper acetate hydrate was replaced with a mixture of copper (I) acetate (97%) and copper acetylacetonate (99%).

Comparative Example I: Preparation of Cu Nanoparticles

The procedure was performed according to Example I, except that the flask was heated to 240° C. (rather than to 200° C.).

Comparative Example II: Preparation of Cu Nanoparticles

The procedure was performed according to Example I, except that the flask was heated to 280° C. (rather than to 200° C.).

Comparative Example III: Two-Step Preparation of Cu Nanoparticles

The procedure was performed according to Example I, except that the flask was heated to 200° C. and held at this temperature for 20 minutes (rather than 60 minutes).

Comparative Example IV: Preparation of Cu Nanoparticles

The procedure was performed according to Example I, except that the TDA was replaced with dodecylamine (DDA, 98%).

Comparative Example V: Single Step Preparation of Cu Nanoparticles

The procedure was performed according to Example IX, except that the flask was heated to about 240° C. (rather than to 200° C.)

Example XIII: Characterization of Nanoparticles

The surface morphology of the nanoparticles was investigated as descried below by a scanning electron microscope (SEM, QUANTA FEG 650) from FEI with a field emitter as the electron source. Elemental analysis was performed on an energy disperses spectroscopy (EDS) system equipped on the SEM. A Bruker D8 Advance X-ray diffractometer with Cu Ka radiation operated at a tube voltage of 40 kV and a current of 40 mA was used to obtain X-ray diffraction (XRD) patterns.

Gas chromatograph (GC 17A, SHIMADZU) was employed to analyze the concentration of gas products. The separated gas products were analyzed by a thermal conductivity detector (for $H_2$) and a flame ionization detector (for CO). Liquid products were analyzed by high pure liquid chromatograph (HPLC, Dionex UltiMate 3000 UHPLC+, Thermo Scientific).

Electrochemical $CO_2$ reduction experiments were conducted using a potentiostat (VersaSTAT MC) in a two compartment electrochemical cell separated by an anion-exchange membrane (Selemion AMV). A platinum plate counter electrode and a leak-free Ag/AgCl reference electrode (Innovative Instruments, diameter: 2.0 mm) were used in a three electrode configuration. Working electrodes were prepared by drop-casting 1.0 µg of Cu or $Cu_3N$—Cu nanoparticles (dispersed in hexanes) onto a carbon glassy electrode (Alfa Aesar: diameter of 1.0 cm2) and drying under argon at room temperature. The working electrode and the counter electrode compartments hold 2.0 mL of electrolyte each, and the working compartment is sealed in order to allow measurements of gas products. All potentials in this work are converted to the RHE scale by E(vs RHE)=E(vs Ag/AgCl)+0.205 V+0.0591×pH. 0.1 M $KHCO_3$ electrolyte was prepared from 0.05 M $K_2CO_3$ saturated with $CO_2$ (pH 7.5).

Example XIII(a): Structural and Compositional Characterization of Nanoparticles

FIG. 4 shows the structural and compositional characterization of $Cu_3N$—Cu and Cu nanoparticles prepared according to Example I and Comparative Example I, respectively. Specifically, FIG. 4D shows an SEM image of branch-shaped nanoparticles having an average diameter of about 80 nm prepared according to Example I. FIG. 4F shows the EDX mapping images of these branch-shaped nanoparticles. As can be seen in FIG. 4F, the EDX mapping images clearly show the presence of both copper and nitrogen along the branch structure, although copper composition was richer. Because there was not any nitrogen source included in the reaction system other than TDA, the only possible source of the nitrogen atoms was the TDA molecules, which have an amine functional group that seemed to act as a ligand to restrict particle overgrowth, since nitrogen atoms can be easily coordinated into a copper nanocrystal's surface.

Figure 4A:
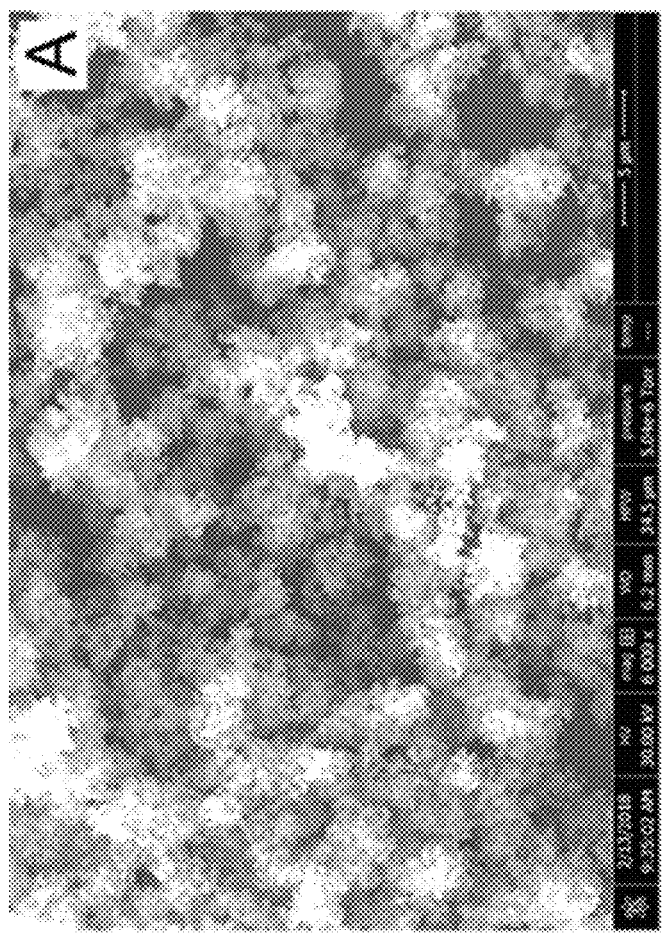
FIG. 4A shows an SEM image of nanoparticles prepared according to Comparative Example I.

Conversely, as shown in FIG. 4A, an SEM image of the branch-shaped nanoparticles prepared according to Comparative Example I indicates that these nanoparticles were formed from pure copper. FIG. 4C shows EDX mapping images of these nanoparticles.

Figure 4B:
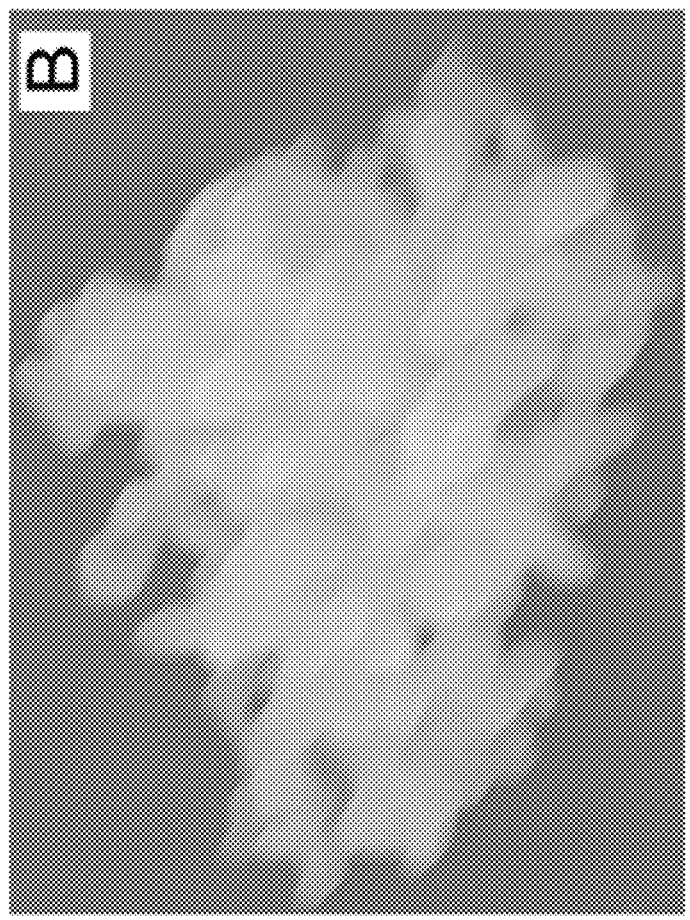
FIG. 4B shows an SEM image of one individual nanoparticle cluster prepared according to Comparative Example I.
Figure 4C:
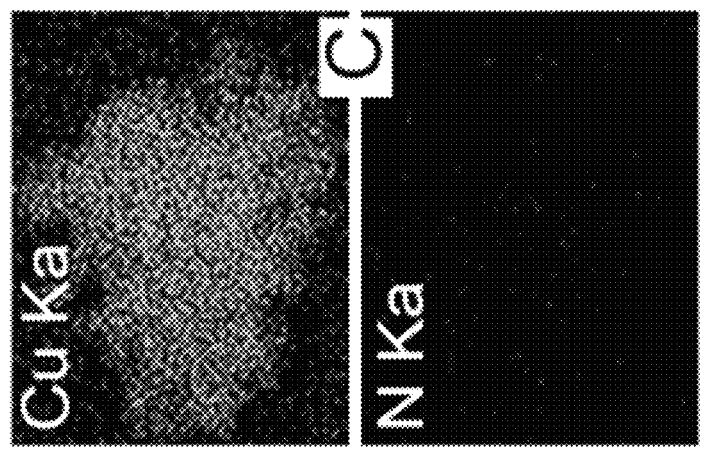
FIG. 4C shows EDX mapping images of nanoparticles prepared according to Comparative Example I.
Figure 4D:
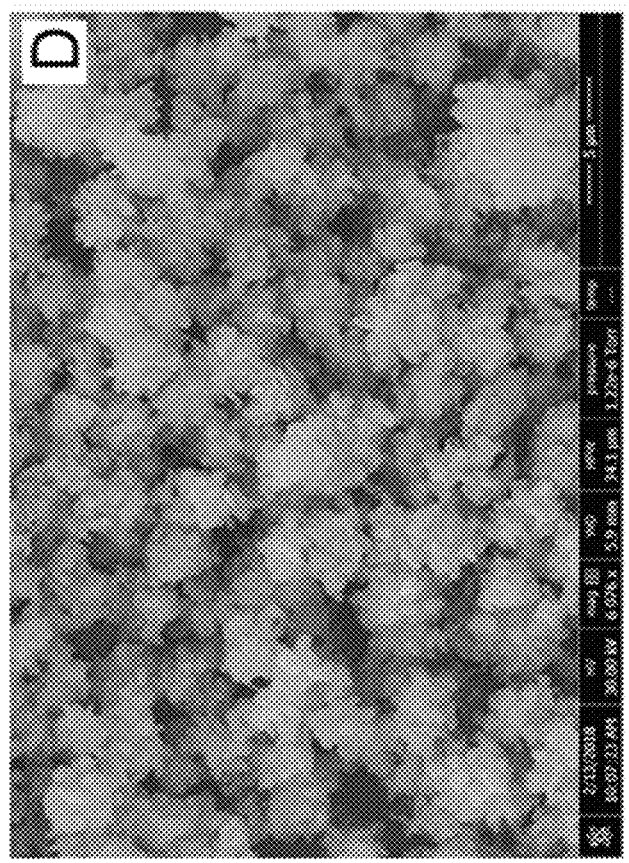
FIG. 4D shows an SEM image of nanoparticles prepared according to Example I.
Figure 4E:
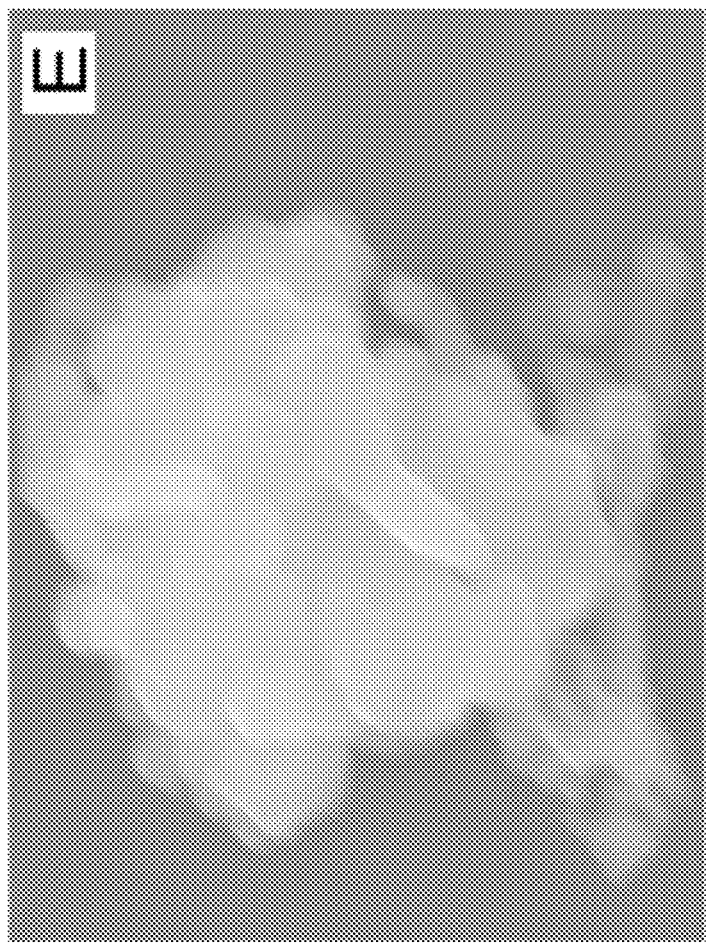
FIG. 4E shows an SEM image of one individual nanoparticle cluster prepared according to Example I.

FIGS. 4B and 4E show individual Cu and $Cu_3N$—Cu nanoparticle clusters, respectively.

Example XIII(b): Elemental Characterization of Nanoparticles

Figure 5:
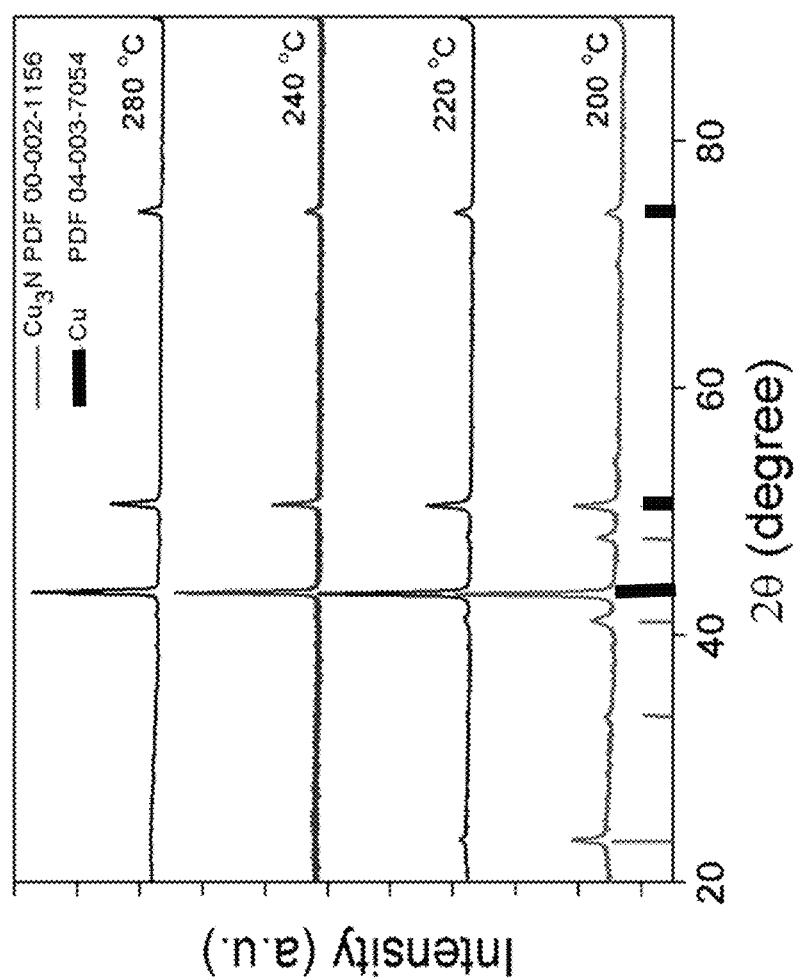
FIG. 5 shows a comparison of the nanoparticles prepared according to Examples I and IV and Comparative Examples I and II using XRD.

FIG. 5 shows a comparison of the nanoparticles prepared according to Examples I and IV and Comparative Examples I and II using XRD. As can be seen in FIG. 5, the reaction temperature had a significant influence on the phase identity of the product.

Figure 4F:
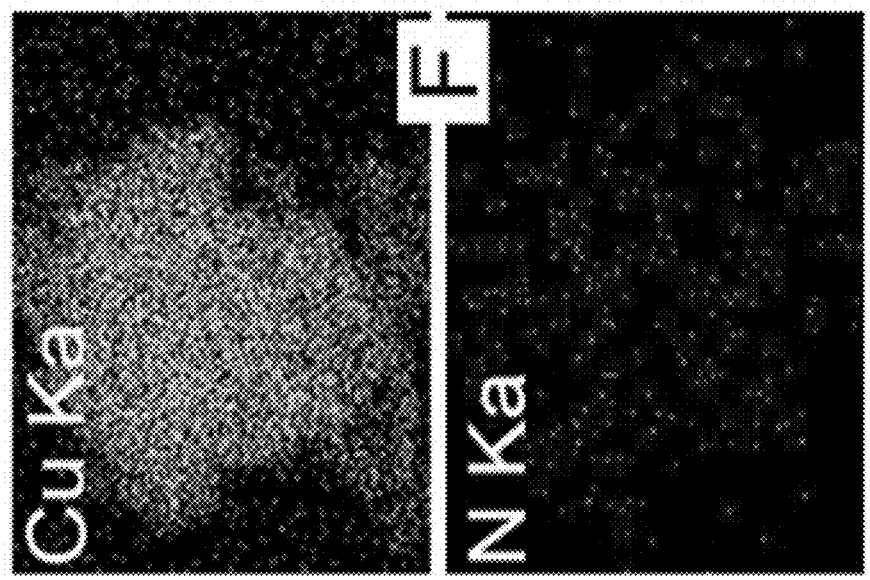
FIG. 4F shows EDX mapping images of nanoparticles prepared according to Example I.

In particular, at a lower reaction temperature (200° C., per Example I), phases of both Cu and $Cu_3N$ were obtained. This indicates that nitrogen atoms of TDA reacted with surface copper atoms to form a $Cu_3N$ phase (as can be seen in FIGS. 4D-F). The cleavage of the C—N bond in a TDA molecule is believed to provide a nitrogen atom to dope a copper crystal cell.

With an increase of temperature to 220° C. (per Example IV), the proportion of the $Cu_3N$ phase was discovered to have decreased while the yield of the Cu phase increased, which indicates the reaction temperature affects the scission motion of C—N bonds on the nanoparticles' surface.

Finally, a pure Cu phase was obtained at higher reaction temperatures (i.e., 240° C., per Comparative Example I, and 280° C., per Comparative Example II), which suggests that no nitrogen doping reaction occurs at temperatures more than 240° C.

Based on TDA's thermodynamic properties, at lower reaction temperatures, more TDA is believed to attach to a copper nanoparticle's surface, which not only restricts the particle growth but also provides a nitrogen source to dope copper crystal cells. Conversely, it may be the case that TDA molecules easily detach from a copper nanoparticle's surface at higher temperatures, thus only a pure copper phase will be formed due to not enough TDA molecules reacting with surface copper atoms of the copper nanoparticle.

Figure 6:
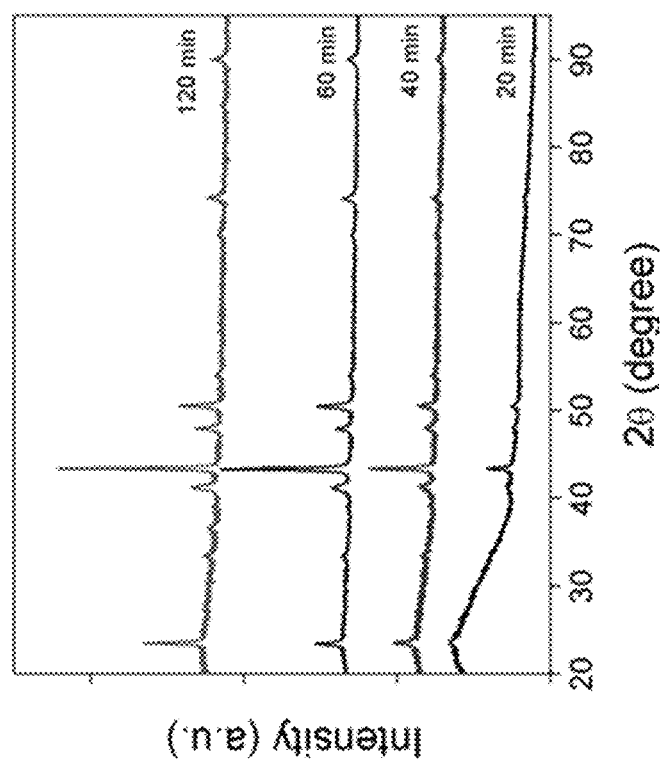
FIG. 6 shows XRD patterns corresponding to the termination of synthesis reactions of nanoparticles at 200° C. at different times per Examples I, V, and VI, and Comparative Example III.

As can be seen in FIG. 6, reaction time also affects the resulting nanoparticles. Specifically, FIG. 6 shows the XRD patterns corresponding to the termination of the synthesis of nanoparticles at 200° C. at different times (i.e., per Examples I, V, and VI, and Comparative Example III). As can be seen in FIG. 6, at the initial stage of reaction (i.e., after 20 min, per Comparative Example III), the Cu phase dominated the whole product. When the reaction was prolonged to 40 min (i.e., per Example V), the $Cu_3N$ phase appeared. With a further increase in reaction time (i.e., to 60 min, per Example I, and to 120 min, per Example VI), the $Cu_3N$ composition of the products increased. It was thus concluded that the reaction undergoes two distinct stages. Specifically, the first stage is the pure Cu phase, while the second stage has a mixture of Cu and $Cu_3N$ phases.

Figure 7:
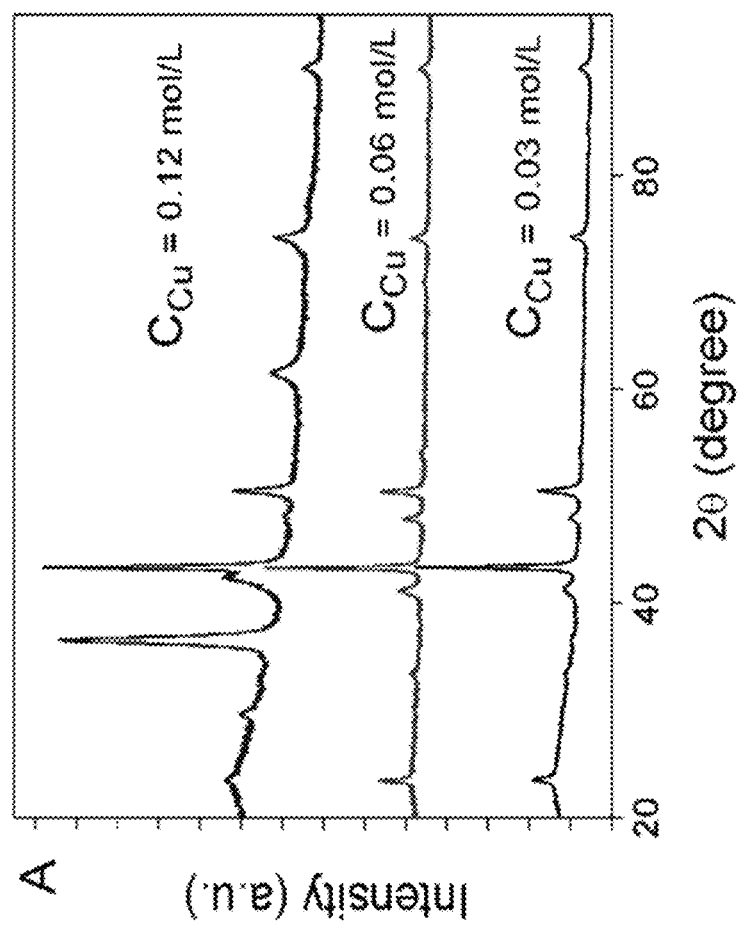
FIG. 7 shows XRD patterns corresponding to the nanoparticles produced according to Examples I, VII, and VIII.
Figure 8:
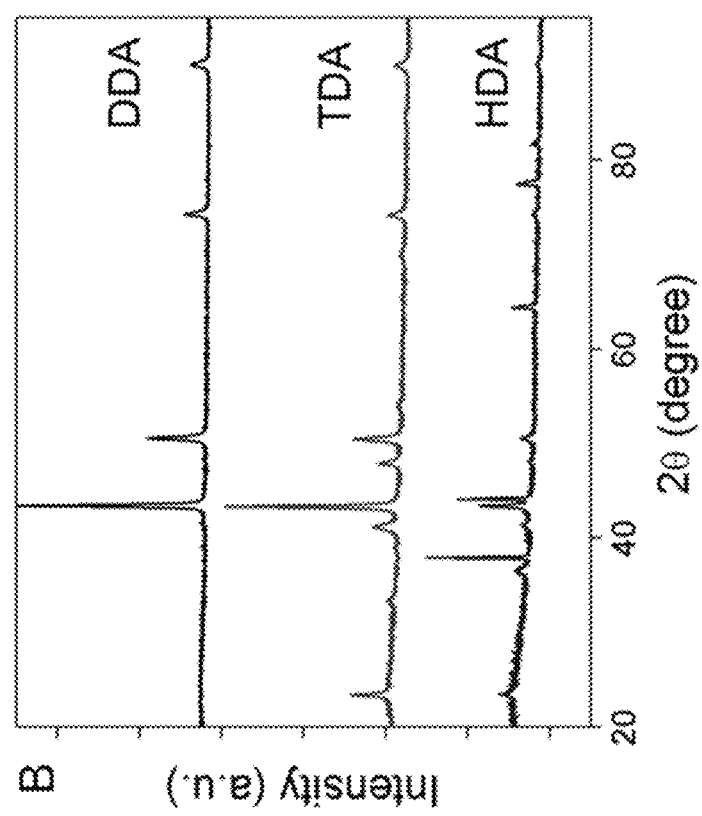
FIG. 8 shows a comparison of XRD patterns corresponding to the nanoparticles produced according to Examples I and II and Comparative Example IV.

As can be seen in FIG. 7 and FIG. 8, respectively, the concentration of copper in the ionic solution and the type of alkylamine used also affect the resulting nanoparticles.

Specifically, FIG. 7 shows a comparison of the XRD patterns corresponding to the nanoparticles produced according to Examples I, VII, and VIII, that is, wherein the stock solution contained 0.03, 0.06, and 0.12 mol/L of copper, respectively. As can be seen in FIG. 7, $Cu_3N$—Cu nanoparticles were easily oxidized at higher copper concentrations (i.e., 0.12 mol/L), likely due to faster nucleation and growth rates, while pure $Cu_3N$—Cu nanoparticles were prepared at lower concentrations (i.e., 0.03 and 0.06 mol/L).

FIG. 8 shows a comparison of the XRD patterns corresponding to the nanoparticles produced according to Examples I and II and Comparative Example IV, that is, wherein the alkylamine used was TDA, HDA, and DDA, respectively. As can be seen in FIG. 8, $Cu_3N$—Cu nanoparticles were obtained using TDA and using HDA. However, no nitrogen doping reaction occurred in the DDA system.

Figure 9:
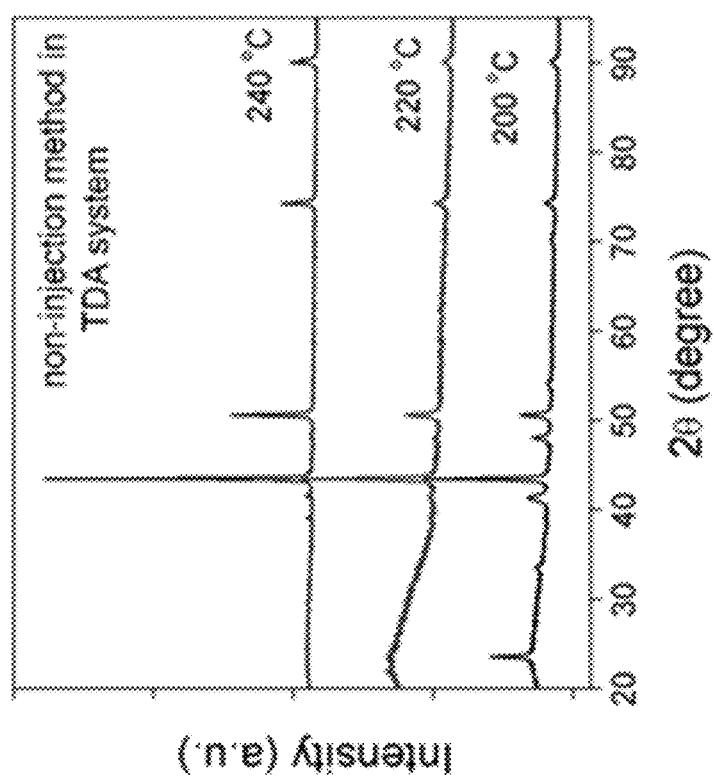
FIG. 9 shows a comparison of XRD patterns corresponding to the nanoparticles produced according to Examples IX and X and Comparative Example V.

FIG. 9 shows a comparison of the nanoparticles produced according to Examples IX and X, and Comparative Example V, that is, a single step preparation method at about 200° C., 220° C., and 240° C., respectively. As can be seen in FIG. 9, the results of the single step preparation methods appeared similar to the results of the two-step preparation method at high temperatures (e.g., as shown in FIG. 5).

Figure 10:
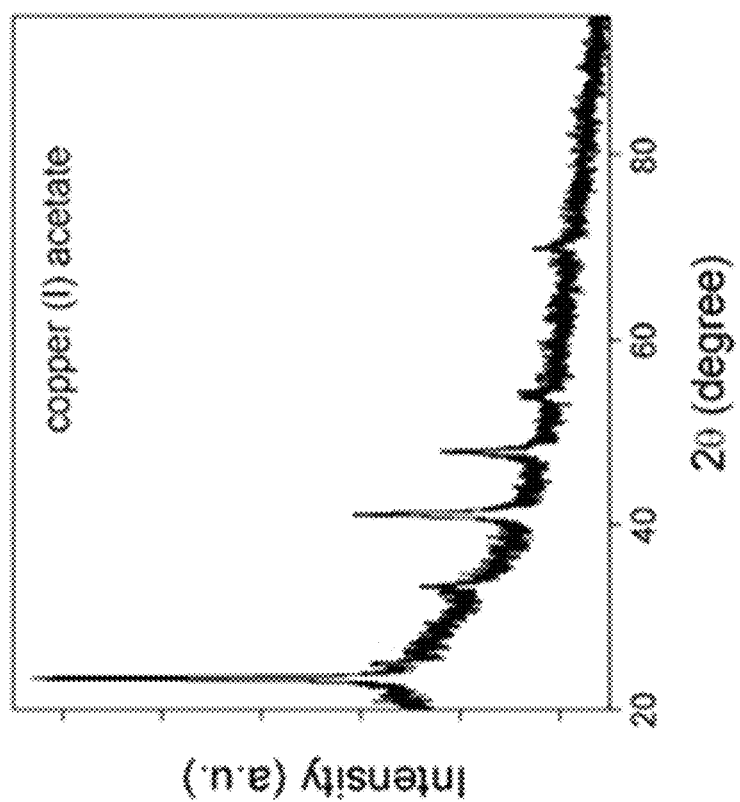
FIG. 10 shows an XRD pattern corresponding to $Cu_3N$—Cu nanoparticles prepared according to Example XI.
Figure 11:
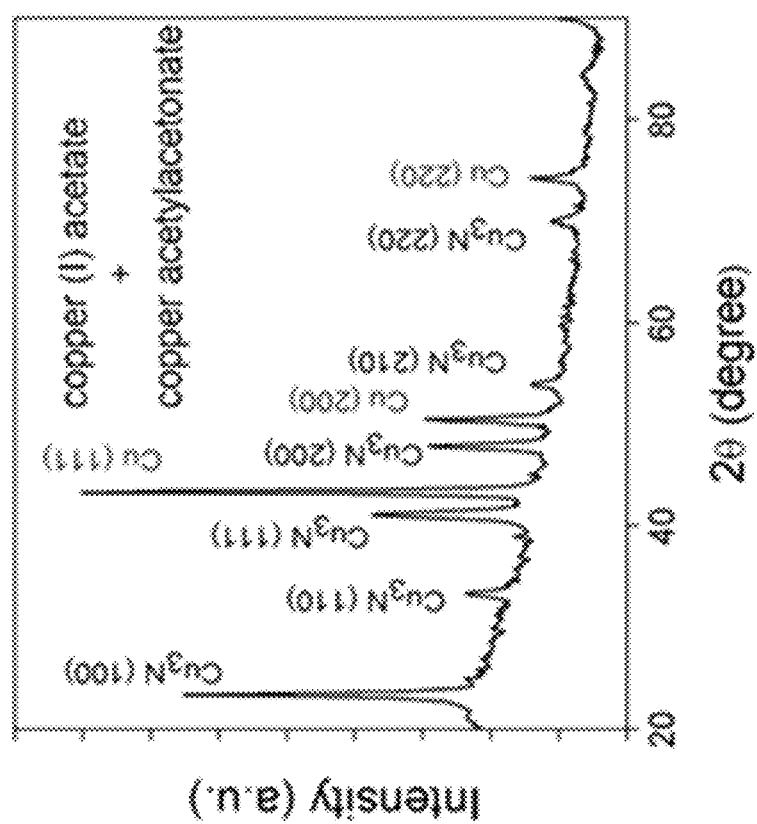
FIG. 11 shows an XRD pattern corresponding to $Cu_3N$—Cu nanoparticles prepared according to Example XII.

As shown in FIGS. 10 and 11, $Cu_3N$—Cu nanoparticles were also prepared by replacing copper acetate hydrate with copper (I) acetate (FIG. 10, per Example XI) or a mixture of copper (I) acetate and copper acetylacetonate (FIG. 11, per Example XII).

Example XIII(c): Electrochemical Characterization of Nanoparticles

The electrochemical properties of the nanoparticles obtained in Example I and Comparative Examples I were compared by studying the conversion of $CO_2$ to certain products using the nanoparticles as catalysts.

Specifically, $CO_2$ flowed through the working compartment of the a two compartment electrochemical cell at a rate of 5 sccm. During chronoamperometry, effluent gases from the cell went through the sampling loop of a GC to analyze the concentration of gas products. Product quantification was performed with conversion factors derived from standard calibration gases. Liquid products were analyzed afterward by HPLC. The concentrations were calculated through the software and were based on calibration curves developed for each individual product. Faradaic efficiencies were calculated from the amount of charge passed to produce each product, divided by the total charge passed at a specific time or during the overall run. The results of this study are shown in FIG. 12.

Figure 12:
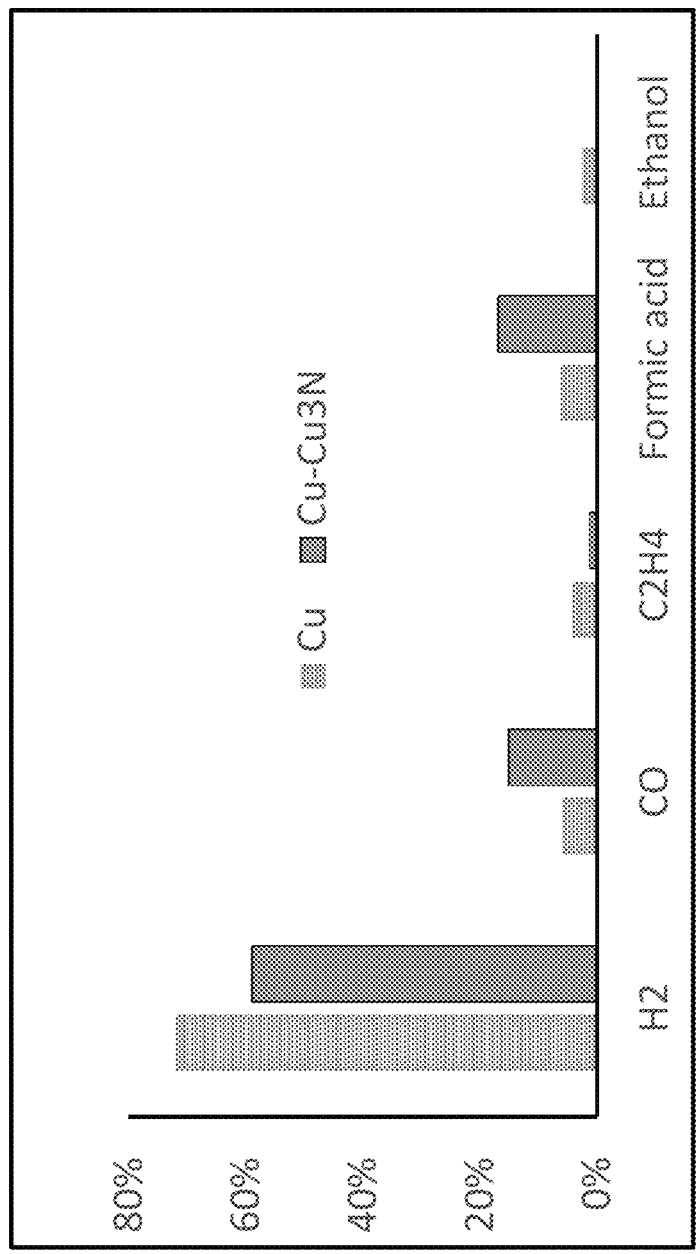
FIG. 12 shows the products of $CO_2$ conversion using pure Cu nanoparticles prepared according to Comparative Example I and $Cu_3N$—Cu nanoparticles prepared according to Example I.

Specifically, FIG. 12 shows the products of $CO_2$ conversion using pure Cu nanoparticles prepared according to Comparative Example I (i.e., as shown in FIG. 4A) and $Cu_3N$—Cu nanoparticles prepared according to Example I (i.e., as shown in FIG. 4D), all of similar size.

As can be seen in FIG. 12, hydrogen was the major product with FE of 59% for $Cu_3N$—Cu nanoparticles and 72% for Cu nanoparticles at −1.05 V, respectively. No ethanol reduction product was detected for $Cu_3N$—Cu nanoparticles. In addition, the FE of C1 products (i.e., CO and formic acid) for $Cu_3N$—Cu nanoparticles was higher than that of Cu nanoparticles. Considering that these two types of catalysts (i.e., Cu and $Cu_3N$—Cu nanoparticles) have similar dimensions, it is believed that the high selectivity of the $Cu_3N$—Cu nanoparticles originates from their unique surface structures.

What is claimed is:

1. A method for making a copper-copper nitride nanocatalyst nanoparticle comprising:
   providing a copper-alkylamine precursor complex, wherein providing the copper-alkylamine precursor complex comprises combining an alkylamine with copper acetate hydrate, copper (I) acetate, copper acetylacetonate, or a combination thereof;
   breaking a C—N bond of the copper-alkylamine precursor complex to provide a copper-copper nitride nanocatalyst nanoparticle comprising a copper component and a copper nitride component; and
   recovering the copper-copper nitride nanocatalyst nanoparticle, wherein:
   breaking the C—N bond comprises subjecting the copper-alkylamine precursor complex to an elevated temperature for a selected period of time, wherein the elevated temperature is from 160 to 240° C.,
   the copper component comprises copper from the copper-alkylamine precursor complex, and
   the copper nitride component comprises copper and nitrogen from the copper-alkylamine precursor complex.

2. The method according to claim 1, wherein the alkylamine is selected from the group consisting of tetradecylamine (TDA), hexadecylamine (HDA), octadecylamine (ODA), and combinations thereof.

3. The method according to claim 1, wherein the method further comprises an Ostwald ripening step.

4. The method according to claim 1, wherein the elevated temperature is is from 160 to 220° C.

5. The method according to claim 1, wherein the selected amount of time is between about 20 and 120 minutes.

6. The method according to claim 1, wherein combining the alkylamine with the copper acetate hydrate, copper (I) acetate, copper acetylacetonate, or combination thereof provides an ionic solution comprising copper ions and ions of the alkylamine, wherein the copper ions are present in the ionic solution at a concentration of between about 0.03 and 0.12 mol/L.

7. The method according to claim 1, wherein the method comprises a single synthesis step.

8. The method according to claim 1, wherein the method comprises at least two synthesis steps.

* * * * *